(No Model.)

G. T. COOK.
EGG WHIPPER.

No. 565,260. Patented Aug. 4, 1896.

Witnesses
O. W. Stipek
P. J. Egan

Inventor
George T. Cook.
By James Shepard,
Atty.

UNITED STATES PATENT OFFICE.

GEORGE T. COOK, OF BRISTOL, CONNECTICUT.

EGG-WHIPPER.

SPECIFICATION forming part of Letters Patent No. 565,260, dated August 4, 1896.

Application filed March 17, 1896. Serial No. 583,621. (No model.)

*To all whom it may concern:*

Be it known that I, GEORGE T. COOK, a citizen of the United States, residing at Bristol, in the county of Hartford and State of Connecticut, have invented certain new and useful Improvements in Egg-Whippers, of which the following is a specification.

My invention relates to improvements in egg and cake whippers or mixers, and the main object of my improvement is to produce a cheap, efficient, and durable implement.

Figure 1:
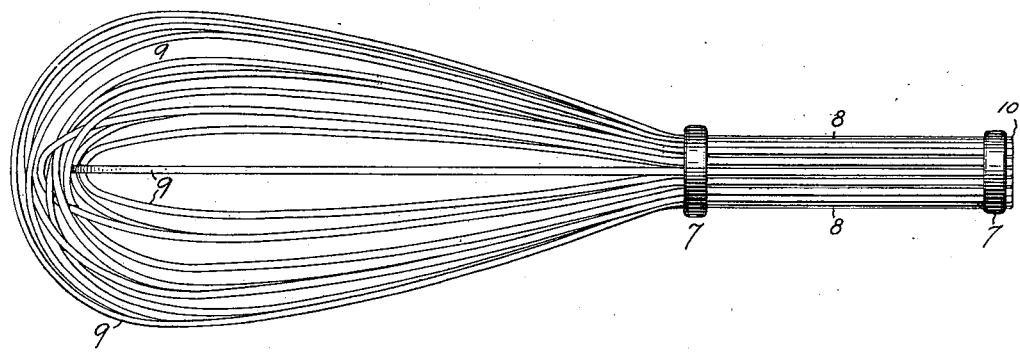
Figure 2:
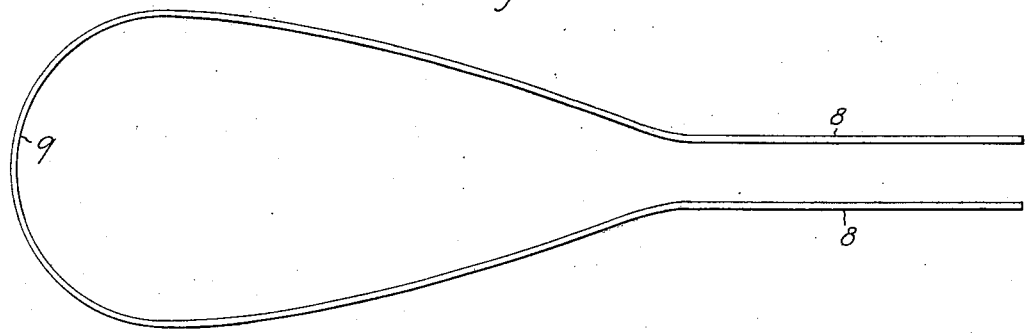
Figure 3:
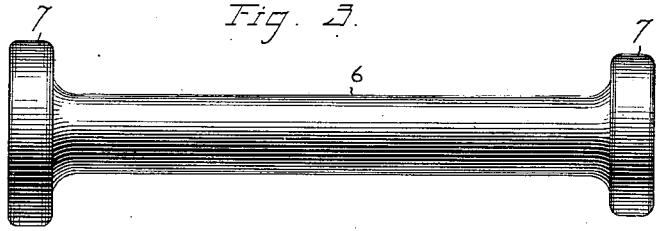
Figure 4:
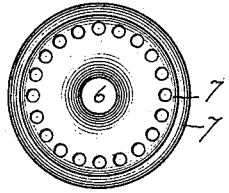
Figure 5:
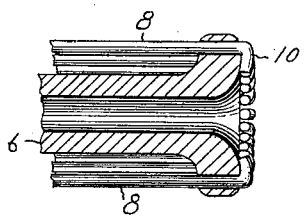

In the accompanying drawings, Figure 1 is a side elevation of my implement. Fig. 2 is a detached side elevation of one of the bow-wires for said implement. Fig. 3 is a detached side elevation of the handle-core. Fig. 4 is an end view of the same, and Fig. 5 is a sectional elevation of the end portion of the handle of my implement.

I form the handle core or support 6 with a flange 7 at each end and perforate said flanges to receive the shanks 8 of the wire bows 9. The shanks of the bows are passed through the perforations in the flanges of the handle-core and their outer ends headed or clenched, as at 10. The wires or shanks are left loose or free to turn and twist in the perforations, especially in the flange that is nearest the bows. If desired, the shanks of the bows at the end farthest therefrom might be rigidly secured in the flange, but I prefer to leave them somewhat loose at both ends. The handle-core can be made of any suitable material, and if desired may be hollow to make it light.

An egg and cake whipper has heretofore been formed of a series of bows with a different construction of handle in which the bows were made rigid with the handle at the point of union. By my improvements the implement can be cheaply made without the use of solder. It is very durable and efficient, while at the same time the bows are yielding and elastic to better accommodate themselves to the blows of the user and to make them fit more closely to the walls of the pail, bowl, or other vessel in which the material is placed to be whipped or mixed.

When the bows are made rigid with the handle, they cannot yield except in the bows themselves, and when struck with much force they are liable to strain the wire at its junction with the handle, so that they often break off at that point. If the wires are soldered, the acid has a tendency to weaken the wires and increase this tendency to break where the strain is brought to bear. When the wires are loosely connected, as in my construction, the bows may yield by the twisting or torsional strain of the wire shanks as well as by the elasticity of the bows themselves, and the wire shanks may even twist or turn in the outer flange of the handle-core. This not only relieves the wires from strain at any one particular point, so that they are not liable to break off by repeated strains, but the bows may twist and turn so as to flat down and hug closely the walls of the pail or bowl, and as soon as the pressure is released they will resume their normal position. The wire shanks also form the grasping-surface of the handle and give the user a yielding, pleasant, and efficient hold.

I wish it distinctly understood that I do not limit myself to the precise details of construction, but desire to cover equivalents and such mechanical changes as may fairly fall within the spirit and scope of my invention.

I claim as my invention—

1. An egg or cake whipper consisting of a handle-core, a series of bows and wire shanks supported at each end of the handle-core and secured thereto but left free to spring or yield inwardly between the ends of the handle, whereby said wire shanks form the yielding grasping-surface of the handle, substantially as described.

2. An egg or cake whipper consisting of a series of wire bows having shanks, and a handle-support at both ends of said shanks with the bow-shanks loosely secured within that end of the handle-support which adjoins said bows and means for preventing the said shanks from withdrawing from said handle-support, substantially as described and for the purpose specified.

3. The herein-described implement consisting of the handle-core having the perforated flanges, and the series of bows having shanks extended through the perforations in said flanges and secured against being withdrawn therefrom, substantially as described and for the purpose specified.

GEORGE T. COOK.

Witnesses:
HOBART BOOTH,
ELBERT E. THORPE.